United States Patent
Olsson et al.

(10) Patent No.: US 11,113,459 B1
(45) Date of Patent: Sep. 7, 2021

(54) DYNAMIC GUIDANCE ENGINE FOR SOFTWARE CUSTOMIZATION SYSTEMS

(71) Applicant: salesforce.com, inc., San Francisco, CA (US)

(72) Inventors: Jan Ove Kristian Olsson, Castro Valley, CA (US); Adheip Varadarajan, San Francisco, CA (US); Jesse Bernoudy, Seattle, WA (US); Michael Gonzalez, Danville, CA (US); Kapil Agarwal, Fremont, CA (US); Chad Hall, Raleigh, NC (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 15/929,820

(22) Filed: May 22, 2020

(51) Int. Cl.
| | |
|---|---|
| *G06F 3/048* | (2013.01) |
| *G06F 40/166* | (2020.01) |
| *G06F 16/958* | (2019.01) |
| *G06F 9/451* | (2018.01) |
| *G06F 3/0483* | (2013.01) |
| *G06N 5/02* | (2006.01) |
| *G06F 40/14* | (2020.01) |
| *G06N 20/00* | (2019.01) |

(52) U.S. Cl.
CPC .......... *G06F 40/166* (2020.01); *G06F 3/0483* (2013.01); *G06F 9/453* (2018.02); *G06F 16/986* (2019.01); *G06F 40/14* (2020.01); *G06N 5/02* (2013.01); *G06N 20/00* (2019.01)

(58) Field of Classification Search
CPC .... G06F 40/166; G06F 3/0483; G06F 16/986; G06F 40/14; G06F 9/453; G06N 5/02; G06N 20/00
See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

*Primary Examiner* — Pei Yong Weng
(74) *Attorney, Agent, or Firm* — Weaver Austin Villeneuve & Sampson LLP

(57) ABSTRACT

Disclosed are some implementations of systems, apparatus, methods and computer program products for providing guidance in relation to the customization of web pages. An indication of user input in relation to a modification to a portion of a web page is processed, where the modification includes deletion of a user interface object from the web page, addition of a user interface object to the web page, or a change to a user interface object of the web page, and where the user interface object represents a data object field or web page component. At least the portion of the web page is analyzed using a plurality of web page customization rules. Feedback pertaining to customization of one or more web pages including the web page is provided for presentation by a client device, via a graphical user interface (GUI), based at least in part on a result of analyzing the portion of the web page using the web page customization rules.

20 Claims, 12 Drawing Sheets

(56) References Cited

U.S. PATENT DOCUMENTS

| | | |
|---|---|---|
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,402,174 B2 | 9/2019 | Varadarajan et al. |
| 10,509,633 B2 | 12/2019 | Varadarajan et al. |
| 10,514,896 B2 | 12/2019 | Varadarajan et al. |
| 10,540,149 B2 | 1/2020 | Varadarajan et al. |
| 10,664,244 B2 | 5/2020 | Olsson |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |

(56) References Cited

U.S. PATENT DOCUMENTS

| | | |
|---|---|---|
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0229101 A1 * | 10/2005 | Matveyenko ........... G06F 40/14 715/234 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2016/0104067 A1 | 4/2016 | Xu et al. |
| 2018/0107665 A1 * | 4/2018 | Yang ...................... G06N 20/00 |
| 2019/0065159 A1 | 2/2019 | Varadarajan et al. |
| 2019/0065487 A1 | 2/2019 | Olsson |

* cited by examiner

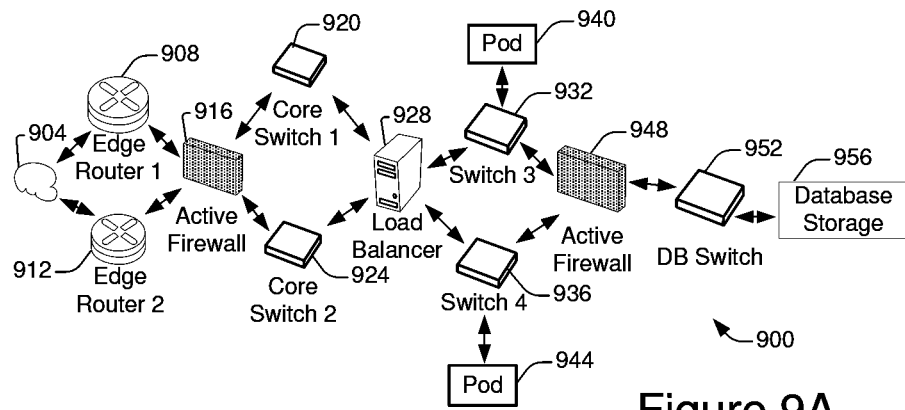
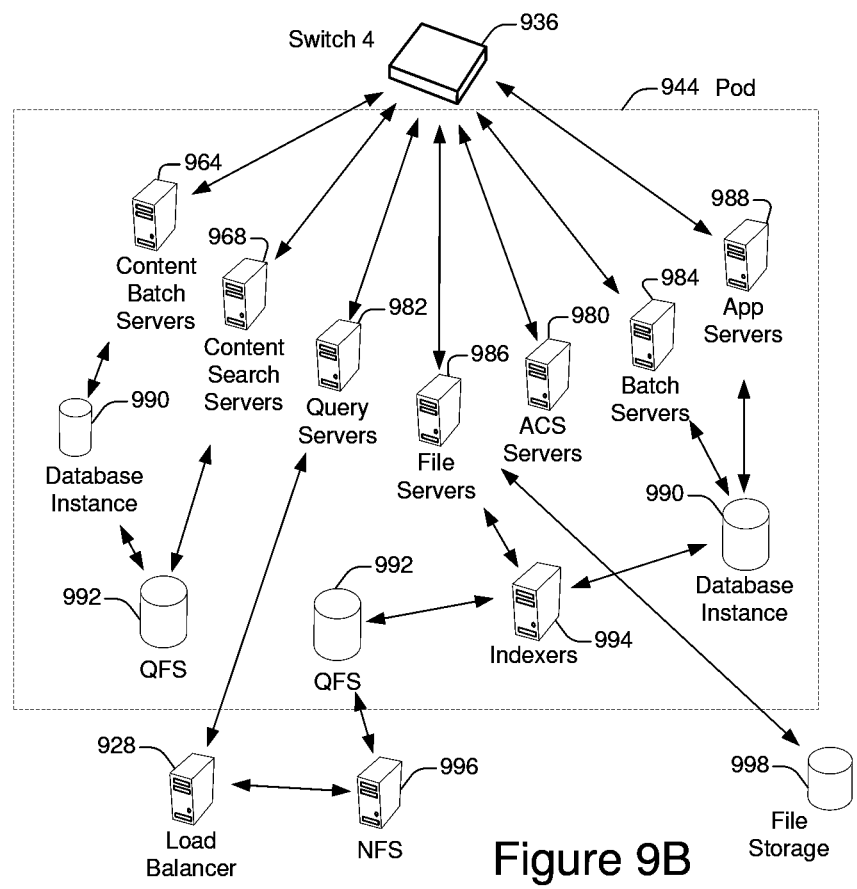

DYNAMIC GUIDANCE ENGINE FOR SOFTWARE CUSTOMIZATION SYSTEMS

COPYRIGHT NOTICE

A portion of the disclosure of this patent document contains material, which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to systems and techniques associated with automated processing of web pages. More specifically, this patent document discloses techniques for intelligently applying web page customization rules to web pages to provide guidance relating to customization of the web pages.

BACKGROUND

"Cloud computing" services provide shared network-based resources, applications, and information to computers and other devices upon request. In cloud computing environments, services can be provided by servers to users' computer systems via the Internet and wireless networks rather than installing software locally on users' computer systems. A user can interact with social networking systems, electronic mail (email) systems, and instant messaging systems, by way of example, in a cloud computing environment.

Businesses often expend a significant amount of resources on website design. One option for website design is to use website templates. A website template is a pre-designed webpage, or set of webpages, that define the placement of the individual page elements within the web pages, the overall appearance of the web pages, and the layout of the website. Using a pre-designed layout allows a developer to drag-and-drop their custom imagery and text into the page elements.

BRIEF DESCRIPTION OF THE DRAWINGS

The included drawings are for illustrative purposes and serve only to provide examples of possible structures and operations for the disclosed systems, apparatus, methods and computer program products for leveraging and managing assessment environments in an assessment hub. These drawings in no way limit any changes in form and detail that may be made by one skilled in the art without departing from the spirit and scope of the disclosed implementations.

FIG. 9A shows a system diagram of an example of architectural components of an on-demand database service environment 900, in accordance with some implementations.

FIG. 9B shows a system diagram further illustrating an example of architectural components of an on-demand database service environment, in accordance with some implementations.

DETAILED DESCRIPTION

Figure 1:
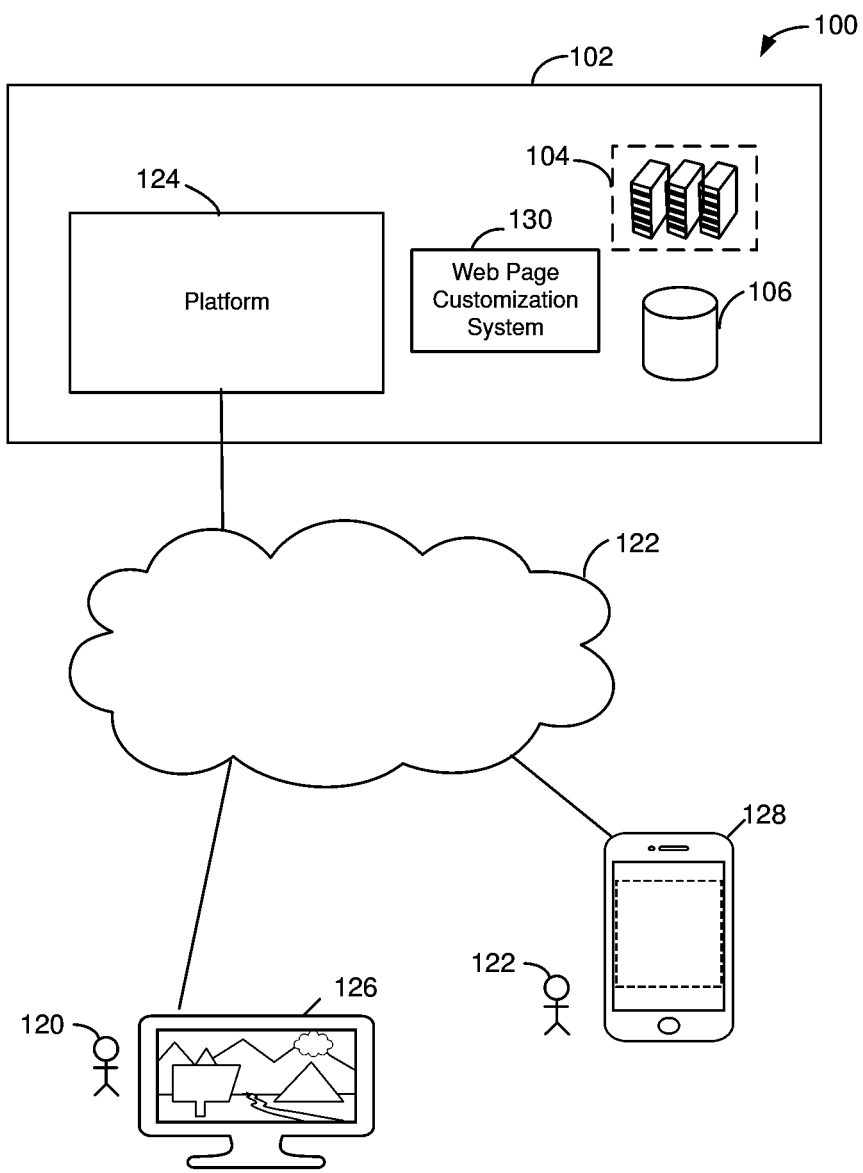
FIG. 1 shows a system diagram of an example of a system 100 in which a web page customization system can be implemented, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods and computer program products are configured for providing user guidance in relation to web page customization. Web page customization can be performed by a server system and/or a browser of a client device.

In some implementations, the disclosed methods, apparatus, systems, and computer program products can be configured or designed for use in a multi-tenant database environment. Web page customization can be configured on a per-tenant basis, as will be described in further detail below A web page customization system enables a website administrator to customize web pages for their organization's business. Often, a website administrator starts with a blank canvas and builds a web page by adding fields or other components to the web page. By building a web page, the website administrator can design the web page to have a specific structure (e.g., layout) and features.

Typically, a library of user-selectable web page components is maintained for use in web page customization. A website administrator can access the library and customize a web page by selecting web page components and placing them at specific locations within the web page. This can be accomplished, for example, by performing "drag-and-drop" operations to drag visual representations of selected web page components from the library and drop them at specific locations within the web page. These visual representations can also be referred to as user interface objects.

Similarly, a website administrator can customize a web page by selecting data object field(s) from a list of user-selectable fields and placing the selected fields at selected locations within the web page. Data object fields can include fields of database tables maintained by or accessible to a database system that facilitates access to the web page customization system. For example, data object fields can be associated with data object(s) stored in a database such as a customer relationship management (CRM) database.

There are a number of drawbacks to existing web page customization systems. More particularly, best practices for building web pages are not typically made available to website administrators. As a result, website administrators are generally unaware of the negative consequences associated with specific website design choices.

A single web page often includes web page components or fields that enable data to be submitted by users and/or provided for presentation within the web page. A website administrator can create a web page that includes any number of fields or other web page components. However, a web page having an excessive number of fields or other components can negatively impact the performance of the web page during run-time. Unfortunately, a website administrator may not recognize potential performance issues or other web page design errors.

Some web page components and fields are represented by corresponding user interface objects rendered within a web page during run-time. During run-time, a user can interact with a user interface object representing a web page component or field to submit a request or data for processing by a database system. Example user interface objects include, but are not limited to, graphic objects, buttons, navigation, links, menus, etc.

A web page component or field can represent or correspond to a backend server process such as a process that provides dynamically updated content or responds to user requests. For example, a web page component can be configured to provide dynamic media content such as a feed. As another example, a web page component or field can be configured to provide access to a content management system, enabling users to edit, view, delete, or create database records.

In some instances, after loading a web page, a user can interact with a user interface object representing a web page component or field. This interaction can cause a corresponding backend server process to update the web page or update a data object stored in a database. By interacting with a user interface object representing a web page component or field, a user can initiate a server process, respond to a server process, or otherwise interact with a server process. However, some web page design choices can cause user confusion or result in performance issues perceived by the user.

In accordance with various implementations, a web page customization system provides user guidance in association with web page customization. User guidance can include a recommendation that a specific web page component or field be added to a web page or removed from a web page. In addition, user guidance can provide recommendations as to the number of web page components or fields, missing web page components or fields, or duplicate web page components or fields. In this manner, a web page customization tool can notify a web page designer of specific ways that they can optimize performance of the web page during run-time.

A web page that is designed and built using a web page customization system can be represented by a page layout. To simplify the following description, the terms "web page" and "page layout" are used interchangeably.

In accordance with various implementations, user guidance may be provided via a reporting tool in association with one or more customized web pages. In some implementations, user guidance can include feedback that is provided dynamically in real-time during web page customization in response to a modification to a web page. Feedback can be provided for presentation via a graphical user interface (GUI), which can be rendered simultaneous with a representation of the web page or an associated layout.

A modification to a web page can include deletion of a web page component or field from the web page, an addition of a web page component or field to the web page, or a modification to an existing web page component or field of the web page. For example, a user such as an administrator can modify a web page by adding a web page component to a web page. This can be accomplished via manipulation of a visual representation of the web page component displayable at a user-selected location within a web page. For example, the web page component can be selected from a set of user-selectable web page components.

In some implementations, a web page customization system includes an analyzer that applies a set of web page customization rules that analyze at least a portion of a customized web page and provides guidance pertaining to the customization. The analyzer can operate automatically in response to a trigger such as a modification to the web page or a user request. Automated real-time web page customization guidance can be turned on or off via a graphical user interface element. Alternatively, the analyzer can generate a report via a report generation tool, either automatically or in response to a user command.

In accordance with various implementations, web page customization rules can include rules that pertain to web page components or fields of a web page. A web page customization rule can indicate an optimal or maximum number of fields or components. For example, a web page customization rule can indicate that a web page containing more than 15 fields will generally result in slow performance during run-time. In addition, a web page customization rule, when applied, can identify empty regions (e.g., tabs or accordion sections) of a web page, duplicate fields or components within the web page, or specific web page components or fields that are missing from the web page.

Some web page customization rules may be applied in specific contexts. For example, a web page customization rule can be configured to be applied in association with at least one of: a specific tenant of a multi-tenant database system, a specific type of web page, an application associated with the web page, a server implementation of the web page customization system, a web browser implementation of the web page customization system, or characteristics of a client device implementing the web page customization system. Example web page types include a record-based web page or a home page.

For example, for a record-based web page, the system can apply a corresponding set of web page customization rules. Upon application of the set of web page customization rules, a set of recommendations may be provided in association with the web page. For example, the recommendations can include a recommendation to add a specific type of web page component such as a Record Detail component to the web page.

By way of illustration, Jan is an employee at an organization, Acme Construction, Inc. Jan is an administrator in the Sales Department and has been asked to design a web page configured to provide sales employees access to database records pertaining to the Acme's customers.

Jan loads a web page customization system via his client device and starts generating a web page. While editing the web page, Jan adds fields including an account field, an address field, a contact field, and a phone number field. In addition, Jan adds web page components to the web page by dragging and dropping user interface objects representing the web page components from Acme's web page component library into the web page. As Jan adds the thirteenth web page component to the web page, a notification is presented within a pop-up window including "Tips" pertaining to web page design. The tips indicate that the web page will exhibit slow performance when accessed by a user during run-time since the number of web page components is greater than 12. In addition, the tips identify a duplicate "Chatter" component that provides a dynamically updated feed from Acme's internal social networking system. The tips also indicate that a record-based web page should include a Related List component, which is absent from the web page. Jan modifies the web page according to the tips provided, saves the web page, and activates the web page.

FIG. 1 shows a system diagram of an example of a system 100 in which a web page customization system can be implemented, in accordance with some implementations. Database system 102 includes a variety of different hardware and/or software components that are in communication with each other. In the non-limiting example of FIG. 1, system 102 includes any number of computing devices such as servers 104. Servers 104 are in communication with one or more storage mediums 106 configured to store and maintain relevant data and/or metadata used to perform some of the techniques disclosed herein, as well as to store and maintain relevant data and/or metadata generated by the techniques disclosed herein. Storage mediums 106 may further store computer-readable instructions configured to perform some of the techniques described herein. In some implementations, storage mediums 106 can store web page customization rules, a library of web page components, a library of data object fields, and web pages, which may be generated, updated, accessed, and/or processed as described in further detail below.

In some implementations, system 102 is configured to store user profiles/user accounts associated with users of system 102. Information maintained in a user account of a user can include or indicate a user email address and credentials of the user. For example, credentials of the user can include a username and password. The information can also include the name of the user. In addition, the information can indicate a role of the user and associated permissions. For example, an administrator or manager may have access to web page customization services, while other employees may not have access to web page customization services, as described herein.

Client devices 126, 128 may be in communication with system 102 via network 122. More particularly, client devices 126, 128 may communicate with servers 104 via network 122. For example, network 122 can be the Internet. In another example, network 122 comprises one or more local area networks (LAN) in communication with one or more wide area networks (WAN) such as the Internet.

Embodiments described herein are often implemented in a cloud computing environment, in which network 122, servers 104, and possible additional apparatus and systems such as multi-tenant databases may all be considered part of the "cloud." Servers 104 may be associated with a network domain, such as www.salesforce.com and may be controlled by a data provider associated with the network domain. A user of client computing device 126 can have an account at salesforce.com®. By logging into this account, the user can access online services offered to customers.

In some implementations, users 120, 122 of client devices 126, 128 can access web page customization services provided by web page customization system 130 by logging into system 102 via platform 124. More particularly, client devices 126, 128 can log into system 102 via an application programming interface (API) or via a graphical user interface (GUI) using credentials of corresponding users 120, 122, respectively. Servers 104 can confirm that users 120, 122 have permission to access web page customization services based upon their roles, as indicated in their respective user profiles. Examples of devices used by users include, but are not limited to, a desktop computer or portable electronic device such as a smartphone, a tablet, a laptop, a wearable device such as Google Glass®, another optical head-mounted display (OHMD) device, a smart watch, etc.

In some implementations, users 120, 122 can access web page customization services by accessing a web page customization application installed on corresponding client devices 126, 128. A web page customization application and web page customization system 130 can communicate to facilitate web page customization services provided by server(s) 104 and/or a web browser of client devices 126, 128. Examples of server and browser-based web page customization services will be described in further detail below.

Figure 2:
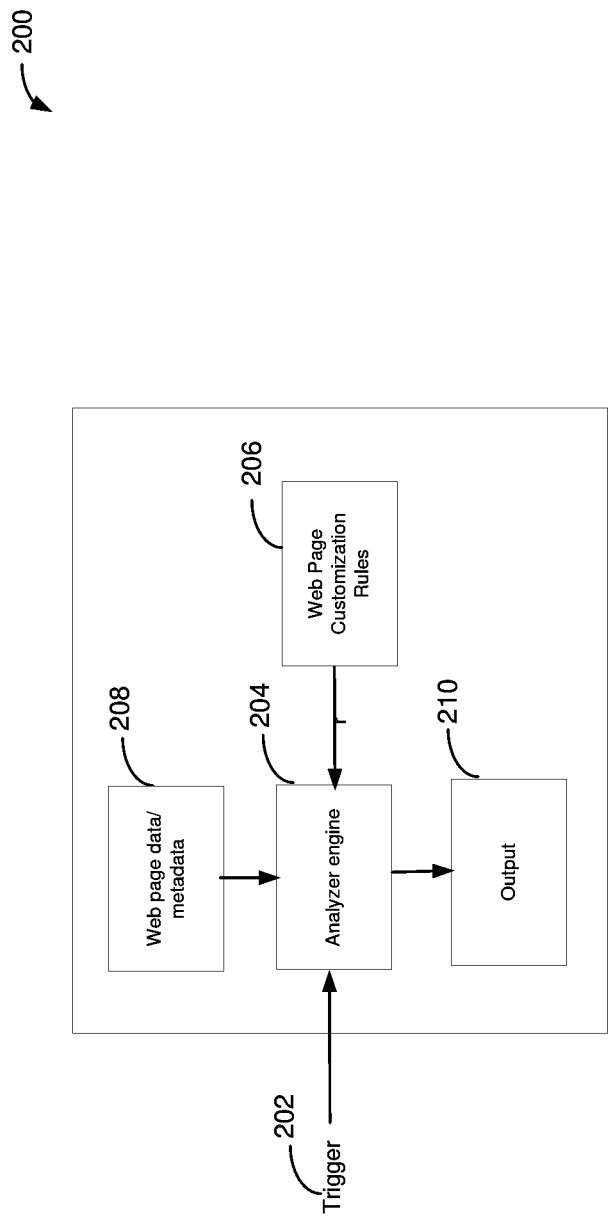
FIG. 2 shows a representation of a web page customization system 200, in accordance with some implementations.

FIG. 2 shows a representation of a web page customization system 200, in accordance with some implementations. Web page customization system 200 can be activated in response to a trigger 202. A trigger can include an automated system-generated trigger or a user-initiated trigger. A trigger can include a modification to a web page such as the modification of properties of the web page, addition of a web page component to the web page, removal of a web page component from the web page, or modification of a web page component of the web page. A trigger can also include a request transmitted to web page customization system 200. For example, the request can include a request to analyze one or more web pages, as described herein. Such a request can be initiated during web page customization or via reporting tool that is configured to generate a report summarizing results of analyzing web page(s), as described herein.

In this example, upon receipt of trigger 202, analyzer engine 204 analyzes a web page or portion thereof based upon a current/recent state of the web page. More particularly, analyzer engine 204 applies a set of web page customization rules 206 to data and/or metadata of the web page or portion thereof, as shown at 208. Web page customization rules 206 accessed and applied by analyzer engine 204 can vary according to various rule selection criteria. In some implementations, the rule selection criteria can be ascertained based, at least in part, on contextual information pertaining to a current context. Contextual information can indicate, for example, whether system 200 being accessed is implemented by server(s) or a web browser, characteristics of a client device or web browser of the client device, a pertinent tenant of a multi-tenant database system, a type or characteristics of a web page being customized, an application via which the web page will be rendered, characteristics of an application via which the web page will be rendered, or characteristics of a client device that will access the web page.

For example, where the application will be installed on a mobile device such as a smart phone, mobile-specific rules can be applied. More particularly, some web page components or associated features may be inoperable on a mobile device. Moreover, the maximum limit for fields and/or components may be lower for a mobile environment than for a desktop environment.

Analyzer engine 204 generates output 210 indicating results of its analysis. In some implementations, analyzer engine 204 provides output 210 dynamically in real-time as a user generates or modifies a web page. In other implementations, analyzer engine 204 provides output 210 in the form of a report that summarizes results of analysis performed by analyzer engine for one or more web pages. Web page customization system 200 can be implemented by server(s) and/or web browser(s) of client devices. Examples of server-based and browser-based web page customization systems will be described in further detail below with reference to FIGS. 3A and 3B, respectively.

Figure 3A:
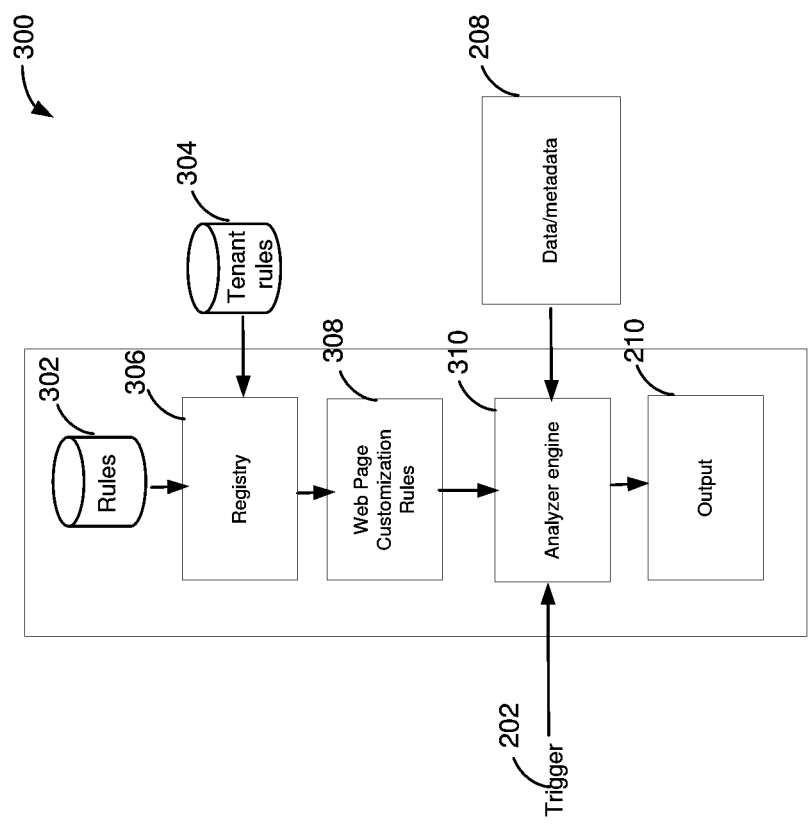
FIG. 3A shows a diagram of an example of a server-based web page customization system 300, in accordance with some implementations.

FIG. 3A shows a diagram of an example of a server-based web page customization system 300, in accordance with some implementations. System 300 can maintain web page customization rules in one or more data stores. In this example, web page customization rules include general web page customization rules 302 that can be applied by any tenant of a multi-tenant database system. In addition, web page customization rules can further include tenant-specific web page customization rules 304. Tenant-specific web page customization rules 304 can include set(s) of tenant-specific rules that each corresponds to a tenant or group of tenants. In some implementations, an organization can enable administrators to customize tenant-specific rules 304 by uploading, generating, editing, and/or deleting tenant specific rules 304 or a portion thereof.

General rules 302 and tenant-specific rules 304 can be maintained in one or more databases. Rules 302 and 304 can each have associated metadata that indicates contexts in which the corresponding rule is to be applied and/or the type(s) of web page modifications to which the rule applies. Each rule can be defined by corresponding computer-readable instructions, data, and/or metadata. A rule can be defined by an equation that includes one or more operators, such as AND, OR, IF, >, =, or <. In addition, a rule can be defined based, at least in part, by one or more variables or data values. For example, a minimum or maximum number associated with a specific type of web page component or field can be specified via a particular data value or variable.

In some implementations, registry 306 is configured to manage and access available rules. More particularly, registry 306 can maintain list(s) of available rules, as well as any associated metadata that indicates contexts in which the rules are to be applied. Registry 306 can also maintain metadata that indicates the types of modifications to which the various rules are applicable. Some of this metadata may be implicit in the categorization of rules into separate lists.

As shown in FIG. 3A, registry 306 can access rules 302 and any tenant-specific rules 304 based, at least in part, on contextual information such as that described herein. For example, contextual information can include or indicate an identifier of a tenant that is pertinent to a web page being analyzed. A pertinent tenant can be identified based, at least in part, on account information of an administrator or another user accessing system 300. In addition, the pertinent tenant can be identified based, at least in part, on a domain accessed by the administrator/user. Registry 306 can look up pertinent rules in tenant-specific rules 304 using a corresponding tenant identifier. Therefore, tenant-specific rules 304 for a specific tenant or group of tenants can be accessed and applied to a corresponding tenant.

Web page customization rules 308 including at least a portion of rules 302 and/or at least a portion of tenant-specific rules 304 can be provided to or otherwise accessed by analyzer engine 310. Specifically, analyzer engine 310 can obtain web page customization rules 308 from registry 306. In some implementations, analyzer engine 310 queries registry 306 to obtain web page customization rules 308. Specifically, analyzer engine can provide registry 306 with parameters that registry 306 can use to select pertinent web page customization rules 308. Parameters can include contextual information, as described herein. Analyzer engine 310 applies web page customization rules 308 to provide output 310 in the form of dynamic real-time feedback or reports, as will be described in further detail below.

Figure 3B:
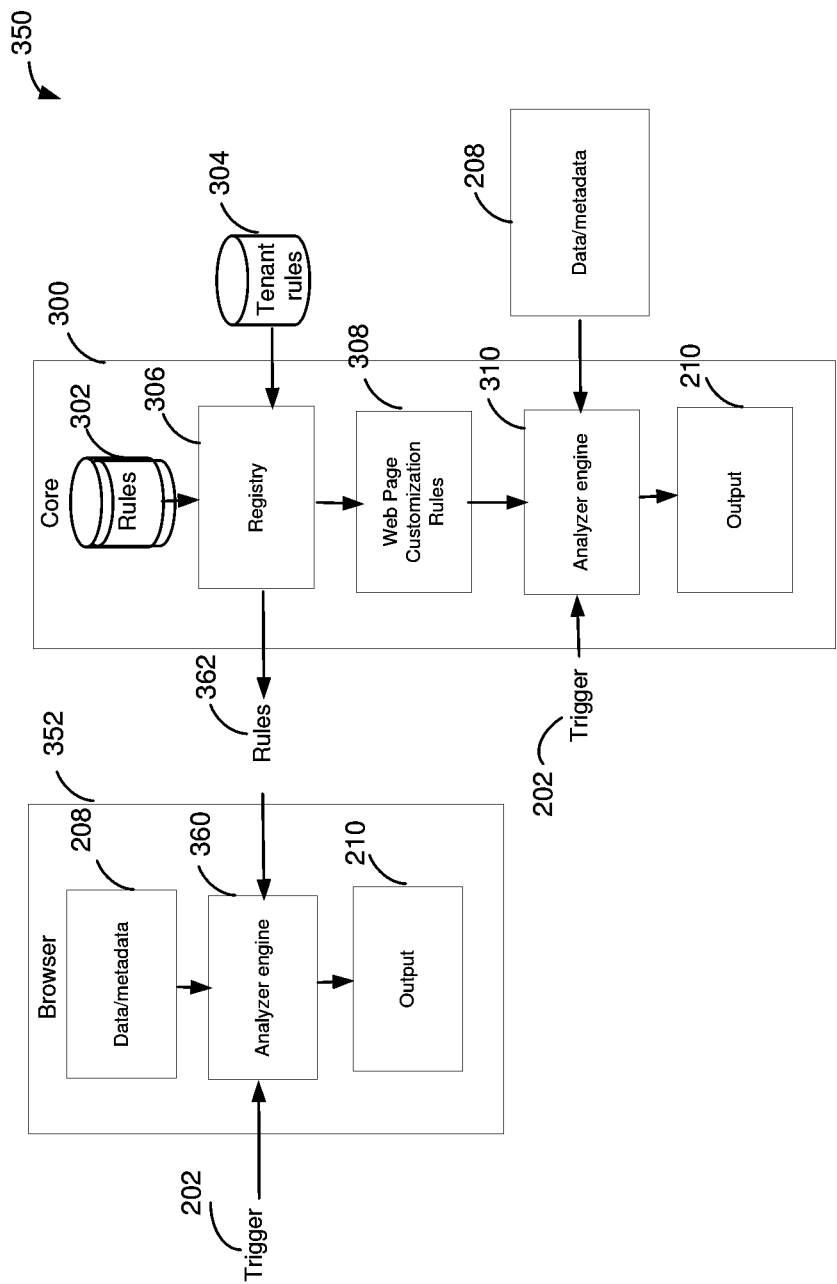
FIG. 3B shows a diagram of an example system 350 including a browser-based web page customization system in communication with a server-based web page customization system, in accordance with some implementations.

FIG. 3B shows a diagram of an example system 350 including a browser-based web page customization system in communication with a server-based web page customization system, in accordance with some implementations. As shown in this example, system 350 can include a browser-based web page customization system 352. Browser-based web page customization system 352 can operate in a similar manner to server-based web page customization system 300. As shown in this example, an analyzer engine 360 can analyze pertinent data and/or metadata 208 associated with a web page using web page customization rules 362 in response to a trigger 202. Analyzer engine 360 can similarly provide output 210 for presentation to an administrator or other user designing a web page.

Since a client device will generally have limited memory, all general and tenant-specific web page customization rules can be stored by server-based web page customization system 300. Server-based system 300 can select rules 362 to transmit to browser-based system 352 based, at least in part, on contextual information such as an identity of the pertinent tenant. For example, server-based system 300 can select a subset of tenant-specific rules 304 to transmit to browser-based system 352. As another example, server-based system 300 can select at least a portion of general rules 302 to transmit to browser-based system 352. By selecting web page customization rules 362 to transmit to a browser-based web page customization system, system 300 can minimize the amount of memory and processing resources consumed by browser-based system 352 operating on a client device.

The transmission of web page customization rules 362 to browser-based system 352 implemented by a client device can be initiated in response to a trigger event. More particularly, system 300 can transmit rules 362 in response to a request from the client device. For example, analyzer engine 360 can transmit a request to registry 306 of server-based web page customization system. The request can include contextual information, as described herein. A request can be transmitted by the client device upon opening of a browser of the client device, a user of the client device initiating browser-based web page customization system 352, or upon loading or downloading of an application implementing browser-based web page customization system to the client device. In some implementations, rules 362 are downloaded to the client device at the time that the application is installed on the client device. Upon receiving web page customization rules from a server, a client device can store the rules in a memory of the client device.

System 300 and/or system 352 can select rules 362 to apply or download to the client device based, at least in part, on various rule selection criteria. Selection of rules 362 can be facilitated by registry 306. Example rule selection criteria include, but are not limited to, an identifier of a pertinent tenant of a multi-tenant database system, a web page type of the web page, an application associated with the web page, a type of application associated with the web page, whether a server or browser-based implementation of the web page customization system is accessed or executing, characteristics of a client device implementing the web page customization system, or characteristics of a client device that will be accessing the web page. For example, a web page type can include a record-based web page or a home page. Characteristics of a client device can include, but are not limited to, type of device (e.g., desktop, smart phone), operating system, central processing unit (CPU) speed, and/or memory capacity.

In some implementations, registry 306 is downloaded to a client device implementing browser-based web page customization system 352. Registry 306 can select rules that are applicable based upon criteria such as rule selection criteria described herein or other contextual information such as the type of web page modification(s) being analyzed. Registry 306 can be downloaded when an application implementing a web page customization system is loaded or downloaded.

In some implementations, server-based system 300 and/or browser-based system 352 can be implemented via execution of computer-readable code on a remote independent system configured to execute computer-readable code such as Javascript and return a result of the execution. For example, an independent system can run an analyzer against a web page using web page customization rules to generate output indicating feedback to provide in association with the web page.

Figure 4A:
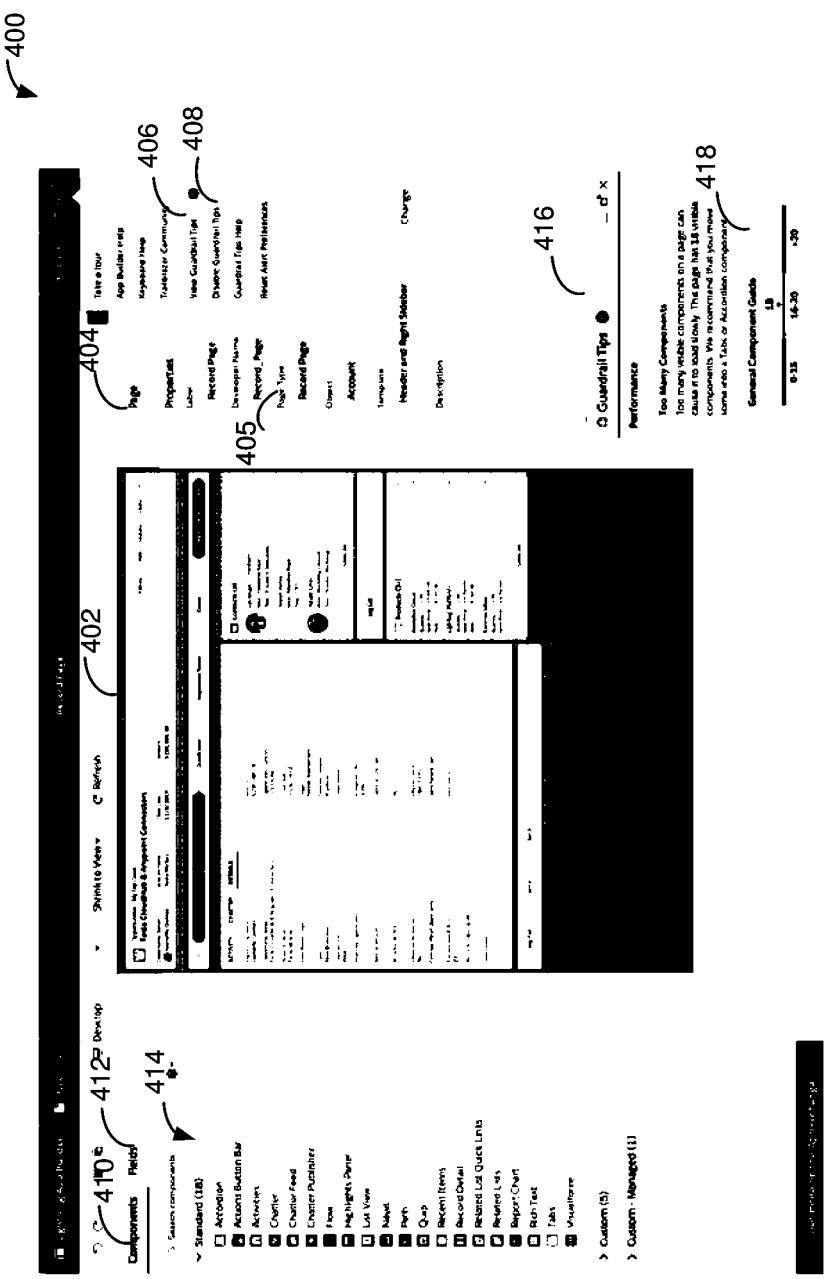
FIG. 4A shows an example of a graphical user interface (GUI) 400 including an example of web page customization feedback that can be generated by a web page customization system, in accordance with some implementations.

FIG. 4A shows an example of a graphical user interface (GUI) 400 including an example of web page customization feedback that can be generated by a web page customization system, in accordance with some implementations. As shown in this example, an administrator or other user can design a web page by accessing a web page editor of a web page customization system, as shown at 402. Web page properties 404 including a web page type 405 can be configured in association with the web page. In this example, web page type 405 has been configured as a record page. GUI 400 can include a web page accessed via a web site of an organization.

In some implementations, web page customization feedback is provided via "tips" rendered simultaneous with the rendering of the web page (or associated layout). A user can choose to view tips 406 or disable tips 408 that are provided by a web page customization system.

Web page 402 can be customized through the selection of web page components 410 from a library of user-selectable web page components. User-selectable web page components can include custom components, which may be generated or obtained by a specific organization or tenant. In this example, the user has clicked on a components tab associated with components 410 to view user-selectable components 414. Example user-selectable components include, but are not limited to, an accordion, an actions button bar, activities, Chatter, Chatter Feed, Chatter Publisher, Flow, Highlights Panel, List View, News, Quip, Recent Items, Record Detail, Related List Quick Links, Related Lists, Report Chart, Rich Text, and Tabs. The user can drag and drop selected components to specific locations within web page 402.

In addition, web page 402 can be customized through the selection of fields 412 from a library of user-selectable fields. User-selectable fields can include custom fields, which may be specific to an organization or tenant. In this example, a user can click on fields tab 412 to view user-selectable fields. User-selectable fields can correspond to fields of database records stored in database(s) of the database system. The user can then drag and drop selected fields to specific locations within web page 402.

Web page customization feedback can include tips that are provided dynamically, in real-time, as web page 402 is customized Tips 416 can be provided in close proximity to web page 402, enabling the user to visualize aspects of web page 402 to which tips 416 refer. In this example, tips 416 are provided within a corresponding segment of GUI 400. This segment can be rendered adjacent to or in close proximity to web page 402, as shown in this example. In some implementations, tips 416 can be rendered in a pop-up window.

Tips 416 can be rendered automatically or in response to a request by the user to view tips 416. For example, the user can view tips 416 by selecting "View Tips" 406. Tips 416 can be generated in response to a trigger such as a modification to web page 402, as described herein.

Tips 416 can notify the user designing web page 402 of the impact their web page modifications are likely to have on performance perceived by end users that access web page 402 during run-time. In this example, tips 416 indicate that web page 402 contains too many components. Specifically, tips 416 notify the user that web page 402 has 18 visible components, which will cause web page 402 to load slowly during runtime when web page 402 is accessed by a client device. Tips 416 can include a guide 418 that assists the user in correcting any issues. As shown in FIG. 4A, guide 418 can provide guidance on selecting an optimal number of components for web page 402.

In this example, guide 418 is presented in the form a graphical representation that illustrates numerical ranges corresponding to quantities of components within a web page. Each numerical range can be distinguished via visual indicator(s) such as a color or pattern. The numerical ranges include an optimal numerical range predicted to provide optimal performance at the time web page 402 is loaded or otherwise accessed. As shown in the example of FIG. 4A, the optimal number of components is between 0 and 15, which can be designated by a green indicator. Numbers of components that lead to performance issues can be designated by a yellow or red indicator. In this example, the number of components that can result in performance issues is between 16 and 20, as designated by a yellow indicator. The number of components that historically results in significant performance issues is greater than twenty, as designated by a red indicator.

In some implementations, a user can configure the type of information that is provided by a web page customization system. By configuring settings associated with the web page customization system, the user can select the types of tips that he or she will be presented. In addition, the user can choose to suppress specific types of tips so that they are not presented.

Figure 4B:
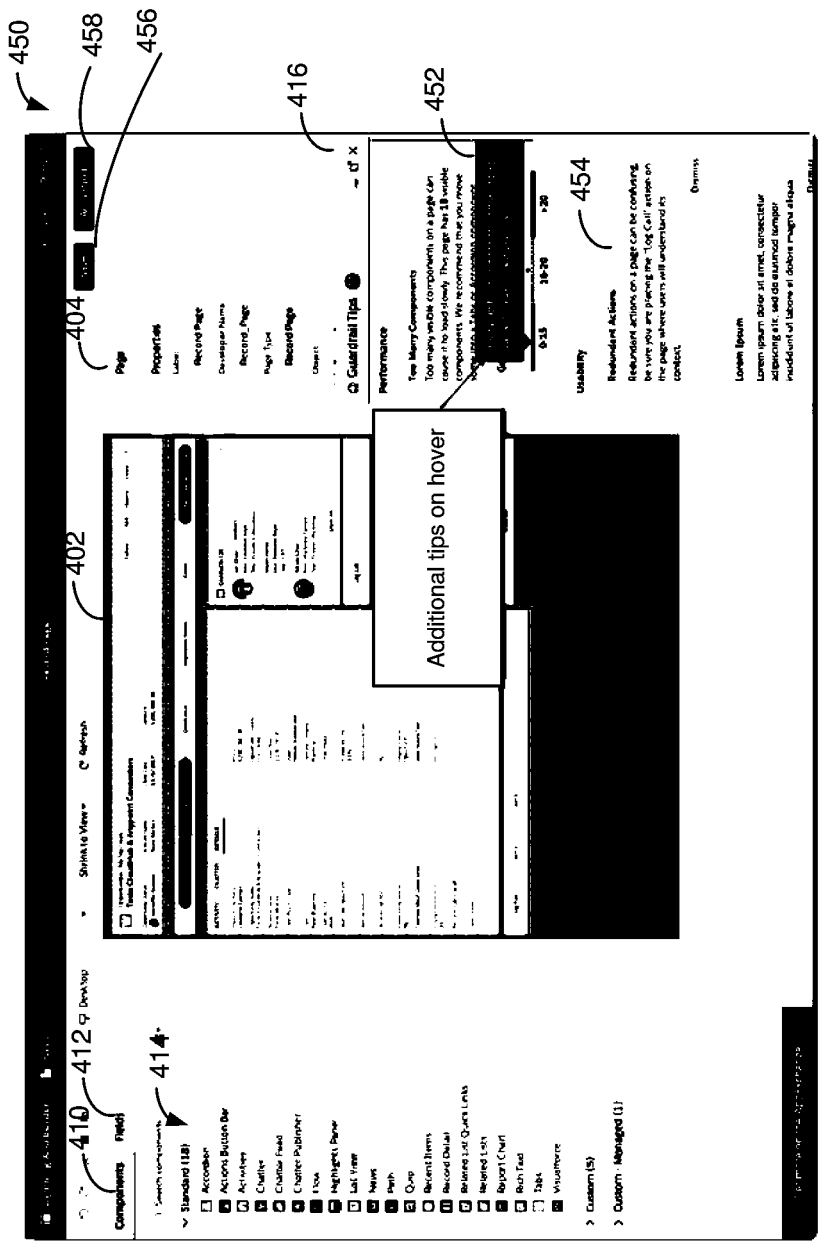
FIG. 4B shows an example of a GUI 450 including an example of web page customization feedback that can be presented in response to user interaction with GUI 400, in accordance with some implementations.

FIG. 4B shows an example of a GUI 450 including an example of web page customization feedback that may be presented in response to user interaction with GUI 400, in accordance with some implementations. A user can hover over a tip such as that presented via a graphical representation to view additional tips or explanations. For example, additional information explaining numerical ranges can be presented. As shown in FIG. 4B, the user can hover over a tip such as a graphical representation illustrating the optimal number of components. In this example, an additional tip 452 notifying the user "Having up to 15 components on your page is a performance best practice" is rendered. Therefore, tips 416 can include best practices pertaining to web page customization.

Tips 416 can include multiple tips pertaining to web page 402. For example, tips 416 can identify redundant components or actions, as shown at 452. Tips can also notify the user of an optimal placement for a particular component or field. Other examples of tips that can be provided include the identification of duplicate components or fields, missing components or fields, empty regions, an optimal number of fields, a recommendation that a particular field or component be added to web page 402, or a recommendation that a particular field or component be removed from web page 402.

The user can modify web page 402 based upon tips 416. The user can save web page 402 by interacting with "Save" user interface object 456. In addition, the user can activate web page 402 by interacting with "Activate" user interface object 458. Once activated, web page 402 can be accessed by end users via their client devices.

Figure 5:
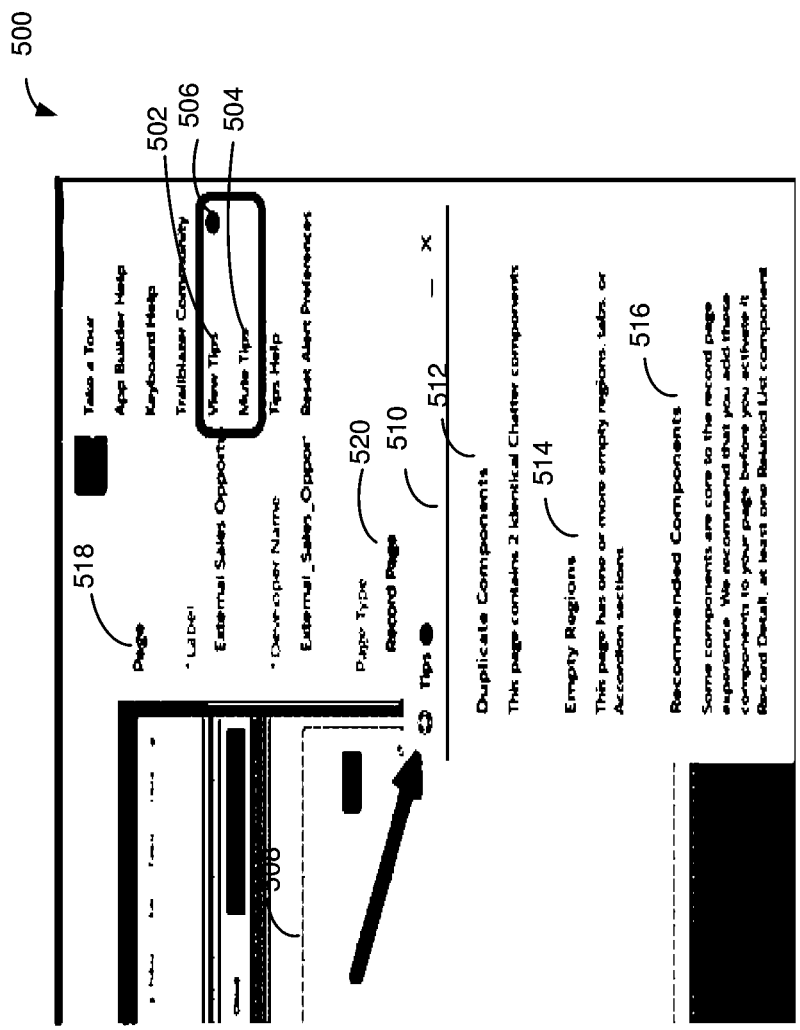
FIG. 5 shows an example of a GUI 500 including an example of web page customization feedback that can be generated by a web page customization system in response to customization of a web page, in accordance with some implementations.

FIG. 5 shows an example of a GUI 500 including an example of web page customization feedback that may be generated by a web page customization system in response to customization of a web page, in accordance with some implementations. As shown in this example, a user can choose to view tips by interacting with corresponding user interface object 502. In addition, the user can mute tips by interacting with corresponding user interface object 504.

An indicator 506 of the number of tips that have been generated by web page customization system can be rendered. In this example, indicator 506 notifies the user that 3 tips have been generated for a corresponding web page 508. The user may decide whether to view tips based upon the number of tips that have been generated.

As shown in FIG. 5, tips 510 can identify duplicate components within web page 508, as shown at 512. In this example, tips 510 indicate that duplicate components 512 include two identical Chatter components.

Tips 510 can also notify the user of empty regions of web page 508, as shown at 514. For example, tips 510 can notify the user of empty tabs, accordion sections, or other regions of web page 508.

Tips 510 can also identify recommended components for web page 508, as shown at 516. In this example, web page properties 518 indicate that web page 508 is a record page, as shown at 520. Thus, in this example, recommended components selected by web page customization system and presented at 516 pertain to a record page. As shown in FIG. 5, tips pertaining to recommended components can notify the user that "some components are core to the record page experience." Recommended components 516 in this example include a Record Detail component and at least one Related List component. Specifically, tips 510 indicates that it is recommended that the user add these components prior to activation of web page 508.

As described above, tips 510 can be presented via a pop-up window. In some implementations, closing of the window by a user can clear a list of tips maintained by the system in association with web page 508. The window can be cleared from GUI 500 until the next tip is identified or the user decides to view any subsequent tips.

Web page customization feedback can also be presented in the form of a report. A request to generate a web page customization report can be initiated automatically (e.g. via a batch file) or via another trigger such as a user-submitted command. In response to a request to generate a report, a report generation tool can trigger an analyzer to execute web page customization rules against a set of custom web pages that have been customized by an administrator or other user. Custom web pages can be stored in a central location such as a directory or set of directories. An administrator/user can notify web page customization system of the location of custom web pages and/or an identity of the custom web pages via a custom web page selection interface.

Figure 6:
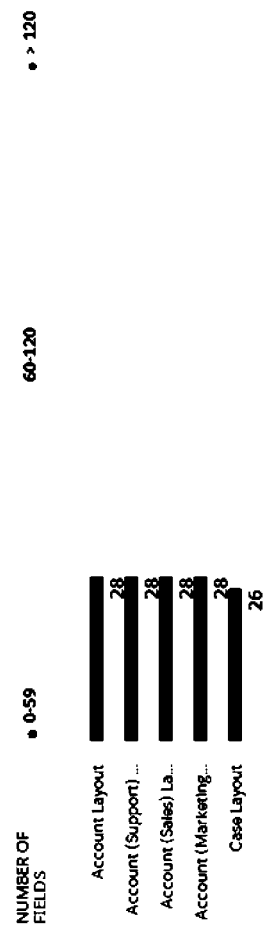
FIG. 6 shows an example of a GUI 600 including an example of a report that can be generated by a web page customization system, in accordance with some implementations.

FIG. 6 shows an example of a GUI 600 including an example of a report that can be generated by a web page customization system, in accordance with some implementations. In this example, a report that analyzes the number of fields in various web pages (e.g., represented by web page layouts) is generated. The number of fields identified in each web page can be specified or represented in the report, as shown in this example. In this example, the report indicates that the optimal number of fields for a web page is between 0 and 59. As shown in FIG. 6, web page customization system has calculated the number of fields in custom web pages and determined that the number of fields within each web page falls within the optimal range. Therefore, the report notifies the user that the web page layouts meet the best practices.

In some implementations, the type of web page customization feedback that is provided in a report is configurable by a user. For example, a user can configure the type(s) of web page components that are addressed in a report.

While the report shown in FIG. 6 pertains specifically to the number of fields within a page layout, this example is merely illustrative. For example, a report pertaining to web page(s) can include web page customization feedback such as identification of duplicate web page components or fields within a web page, identification of a specific field or web page component that is missing from the web page, a recommendation that a particular field or web page component be removed from the web page, a recommendation pertaining to a quantity of components within the web page, a recommendation pertaining to a quantity of components of a particular component type within the web page, and/or a recommendation pertaining to a quantity of fields within the web page. Therefore, reports pertaining to a variety of web page components and/or fields can be generated for a given web page or set of web pages.

Figure 7:
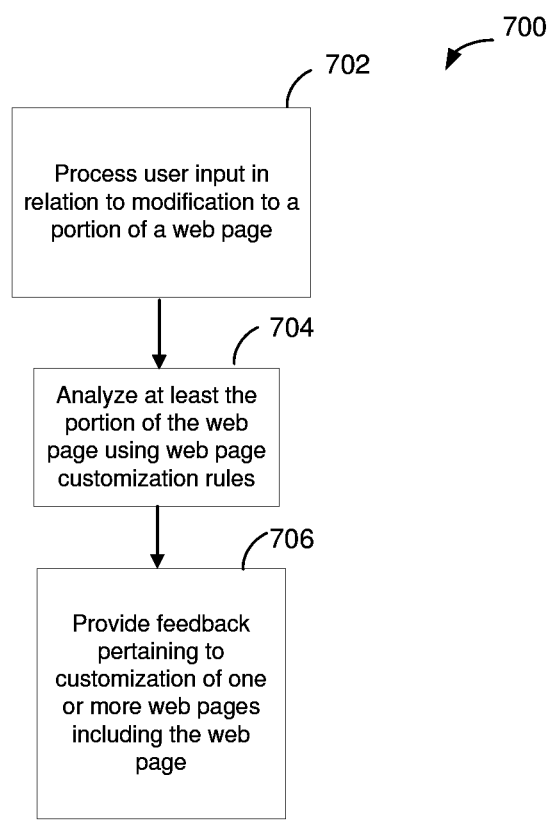
FIG. 7 shows an example of a method 700 for providing customization guidance for a web page, in accordance with some implementations.

A web page customization system implemented at a client device and/or server(s) can provide customization guidance in real-time during web page customization or via reports generated after web page customization has been completed. FIG. 7 shows an example of a method 700 for providing customization guidance for a web page, in accordance with some implementations. A user can access the web page customization system via a corresponding web page or an application installed on a client device. Within the web page customization system, the user can load an existing web page that they would like to customize or, alternatively, the user can create a new web page.

The user modifies a web page, and an indication of user input in relation to a modification to a portion of the web page is processed at 702. The web page can include an existing web page or a newly created web page that is being generated by a user. The modification can include, for example, deletion of a user interface object from the web page, addition of a user interface object to the web page, or modification to a user interface object of the web page. In addition, the modification can include configuring web page properties such as a web page type of the web page.

A user interface object can represent a data object field or web page component. For example, a user interface object can include a visual representation of a data object field or web page component. A user interface object can be dragged and dropped from a set of user-selectable web page components to a specific location within the web page. Similarly, a user interface object can be dragged and dropped from a set of user-selectable data object fields to a specific location within the web page.

Each of the user-selectable data object fields can correspond to a field of a database configured to store database records. For example, a database configured to store Account information can include fields for Account Identifier, Address, Contact Name, and Phone Number. The user-selectable set of user-selectable fields can reflect fields of databases accessible by a database system associated with the web page customization system. In some implementations, the set of user-selectable fields includes a subset of the fields of databases maintained or accessible by the database system.

In accordance with some implementations, user interface objects are visible to the user creating the web page. Some user interface objects may be visible to users accessing the web page during runtime. In addition, users accessing the web page during runtime can interact with some user interface objects (e.g., buttons, tabs, fields) during runtime. However, some user interface objects may not be visible to users accessing the web page during runtime (e.g., upon loading of the web page to a client device). Alternatively, the appearance of a user interface object to users accessing the web page during runtime may differ from the appearance of the user interface object during web page creation (e.g., within a page layout). For example, a user interface object representing a feed may be replaced during runtime by dynamically obtained content.

After processing the indication of user input in relation to the modification to the portion of the web page, at least the portion of the web page is analyzed using a plurality of web page customization rules at 704. More particularly, an analyzer can execute at least a portion of the web page customization rules to evaluate the web page or portion thereof or, more specifically, to evaluate the modification to the web page. The analyzer can obtain web page customization rules, as described herein. The web page or portion thereof can be analyzed in real-time responsive to processing the indication of user input based upon a current state of the web page. Alternatively, the web page or portion thereof can be analyzed responsive to an indication of selection of a report generation user interface element. In this manner, an analyzer can evaluate modifications to the web page and provide guidance that enables any issues to be corrected before activating the web page.

The web page customization rules can include a first set of web page customization rules pertaining to data object fields and/or a second set of web page customization rules pertaining to web page components. Web page components may be user selectable from a set of web page components for addition to web pages. Similarly, each of the data object fields may be user selectable from a set of data object fields for addition to web pages.

In some implementations, only the portion of the web page that has been modified is analyzed. More particularly, the web page customization system can detect a change to the web page in real-time and apply web page customization rule(s) that pertain to the change. For example, where the user adds a field, the first set of web page customization rules or a portion thereof can be applied without applying the second set of web page customization rules. Alternatively, the web page customization system can update a list of modifications to the web page as a user modifies the web page. Upon receipt of a request by the user to show tips pertaining to the web page, the system can apply the web page customization rules, which may include those rules that the system has determined are pertinent to the modifications identified in the list. By waiting until the user chooses to view tips, the system may eliminate processing for modifications that the user decides not to implement during web page customization. The system may determine that some rules are not pertinent to the modifications identified in the list, enabling the system to apply a limited number of rules.

The web page customization rules that are applied by the web page customization system can be selected based, at least in part, on criteria such as contextual information described herein. Rules can have metadata associated therewith that indicates contexts in which those rules are to be applied. For example, a library of rules can include rule(s) associated with one or more of: a specific tenant of a multi-tenant database system, a web page type (e.g., associated with the web page), a particular application (e.g., associated with the web page), a type of application (e.g., associated with the web page), a server implementation of the web page customization system, a web browser implementation of the web page customization system, characteristics of a client device implementing the web page customization system, or characteristics of a client device that will access the web page during runtime. For example, rules can be configured specifically for customization of web pages that will be rendered in a mobile environment by a mobile application or, alternatively, rendered by a web application. This enables performance of web pages to be optimized for use in a variety of contexts and environments.

In some implementations, a web page is represented by a tree data structure. To analyze the web page or portion thereof, an analyzer can traverse the tree data structure and apply the web page customization rules to data and/or metadata represented at nodes of the tree data structure.

Feedback pertaining to customization of one or more web pages including the web page is provided for presentation by a client device via a GUI based, at least in part, on a result of analyzing the web page or portion thereof using the web page customization rules at 706. As described above, the feedback can be presented via a GUI element that is presented simultaneously with the web page. More particularly, the GUI element can be rendered within a region of a screen in which the web page being customized is being displayed. The GUI element can include a pop-up window that presents the feedback. Alternatively, the feedback can be presented via a report that is generated after the user has customized the web page.

As described herein, the feedback pertaining to the web page can notify the user of issues including, but not limited to: an identification of a missing field or component; an empty region of the web page; an identification of a duplicate field or component; a recommendation that a particular field or component be added or removed; a recommendation pertaining to a quantity of fields or components; or a recommendation pertaining to a quantity of components of a particular component type. The feedback can also identify performance issues that are likely to result from issues that are identified. In addition, the feedback can guide the user in correcting any issues that have been detected.

After providing the feedback pertaining to the web page, the user can make further modifications to the web page. The web page can be stored responsive to processing an indication of a user request to save the web page. The web page can then be activated so that it can be accessed by users via a network.

In some implementations, performance data is collected for custom web pages as end users access the web pages during run-time. By collecting performance data, it is possible ascertain the level of impact a specific customization will have on an organization and its end users. As a result, performance data that is collected can be used to generate or update web page customization rules. This enables appropriate feedback to be generated and transmitted to administrators of the organization. In some instances, the feedback can pertain to specific customizations within a web page. In other instances, the feedback can pertain to the impact of specific hardware or software on runtime performance. For example, an administrator can be notified that a new browser version is negatively impacting performance In some implementations, a machine learning model can be generated and updated by applying a machine learning algorithm to performance data collected during runtime for custom web pages. For example, data such as the time it takes to render a custom web page can be collected. As another example, data such as a time delay associated with various components or features of a custom web page can be collected. The machine learning model can be used to generate or update web page customization rules. For example, a machine learning algorithm can be applied to help define the limits such as the maximum number of fields permitted on a web page. In this manner, performance data that is collected for web pages can be applied to generate or update web page customization rules.

The above-described implementations pertain to the customization of web pages. However, these examples are merely illustrative. Therefore, the disclosed implementations may also be applied to customization of other types of user interfaces or applications.

Some but not all of the techniques described or referenced herein are implemented using or in conjunction with a social networking system. Social networking systems have become a popular way to facilitate communication among people, any of whom can be recognized as users of a social networking system. One example of a social networking system is Chatter®, provided by salesforce.com, inc. of San Francisco, Calif. salesforce.com, inc. is a provider of social networking services, CRM services and other database management services, any of which can be accessed and used in conjunction with the techniques disclosed herein in some implementations. In some but not all implementations, these various services can be provided in a cloud computing environment, for example, in the context of a multi-tenant database system. Thus, the disclosed techniques can be implemented without having to install software locally, that is, on computing devices of users interacting with services available through the cloud. While the disclosed implementations are often described with reference to Chatter®, those skilled in the art should understand that the disclosed techniques are neither limited to Chatter® nor to any other services and systems provided by salesforce.com, inc. and can be implemented in the context of various other database systems and/or social networking systems such as Facebook®, LinkedIn®, Twitter®, Google+®, Yammer® and Jive® by way of example only.

Some social networking systems can be implemented in various settings, including organizations. For instance, a social networking system can be implemented to connect users within an enterprise such as a company or business partnership, or a group of users within such an organization. For instance, Chatter® can be used by employee users in a division of a business organization to share data, communicate, and collaborate with each other for various social purposes often involving the business of the organization. In the example of a multi-tenant database system, each organization or group within the organization can be a respective tenant of the system, as described in greater detail below.

In some social networking systems, users can access one or more social network feeds, which include information updates presented as items or entries in the feed. Such a feed item can include a single information update or a collection of individual information updates. A feed item can include various types of data including character-based data, audio data, image data and/or video data. A social network feed can be displayed in a graphical user interface (GUI) on a display device such as the display of a computing device as described below. The information updates can include various social network data from various sources and can be stored in a database system. In some but not all implementations, the disclosed methods, apparatus, systems, and computer program products may be configured or designed for use in a multi-tenant database environment.

In some implementations, a social networking system may allow a user to follow data objects in the form of CRM records such as cases, accounts, or opportunities, in addition to following individual users and groups of users. The "following" of a record stored in a database, as described in greater detail below, allows a user to track the progress of that record when the user is subscribed to the record. Updates to the record, also referred to herein as changes to the record, are one type of information update that can occur and be noted on a social network feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be social media messages submitted by a user or can be otherwise generated in response to user actions or in response to events. Examples of social media messages include: posts, comments, indications of a user's personal preferences such as "likes" and "dislikes", updates to a user's status, uploaded files, and user-submitted hyperlinks to social network data or other network data such as various documents and/or web pages on the Internet. Posts can include alpha-numeric or other character-based user inputs such as words, phrases, statements, questions, emotional expressions, and/or symbols. Comments generally refer to responses to posts or to other information updates, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed. A user's profile feed is also referred to herein as the user's "wall," which is one example of a social network feed displayed on the user's profile page.

In some implementations, a social network feed may be specific to a group of users of a social networking system. For instance, a group of users may publish a feed. Members of the group may view and post to this group feed in accordance with a permissions configuration for the feed and the group. Information updates in a group context can also include changes to group status information.

In some implementations, when data such as posts or comments input from one or more users are submitted to a social network feed for a particular user, group, object, or other construct within a social networking system, an email notification or other type of network communication may be transmitted to all users following the user, group, or object in addition to the inclusion of the data as a feed item in one or more feeds, such as a user's profile feed, a news feed, or a record feed. In some social networking systems, the occurrence of such a notification is limited to the first instance of a published input, which may form part of a larger conversation. For instance, a notification may be transmitted for an initial post, but not for comments on the post. In some other implementations, a separate notification is transmitted for each such information update.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. As mentioned below, the data can include social media messages created by other users. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "social network feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) generally refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different types of social network feeds. A second user following a first user and a record can receive the feed items associated with the first user and the record for display in the second user's news feed, which is another type of social network feed. In some implementations, the feed items from any number of followed users and records can be combined into a single social network feed of a particular user.

As examples, a feed item can be a social media message, such as a user-generated post of text data, and a feed tracked update to a record or profile, such as a change to a field of the record. Feed tracked updates are described in greater detail below. A feed can be a combination of social media messages and feed tracked updates. Social media messages include text created by a user, and may include other data as well. Examples of social media messages include posts, user status updates, and comments. Social media messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a GUI, for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Social media messages and other types of feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and social media messages, such as posts, comments, likes, etc., can define group conversations and change over time.

An "entity feed" or "record feed" generally refers to a feed of feed items about a particular record in the database. Such feed items can include feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" generally refers to a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

Some non-limiting examples of systems, apparatus, and methods are described below for implementing database systems and enterprise level social networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

Figure 8A:
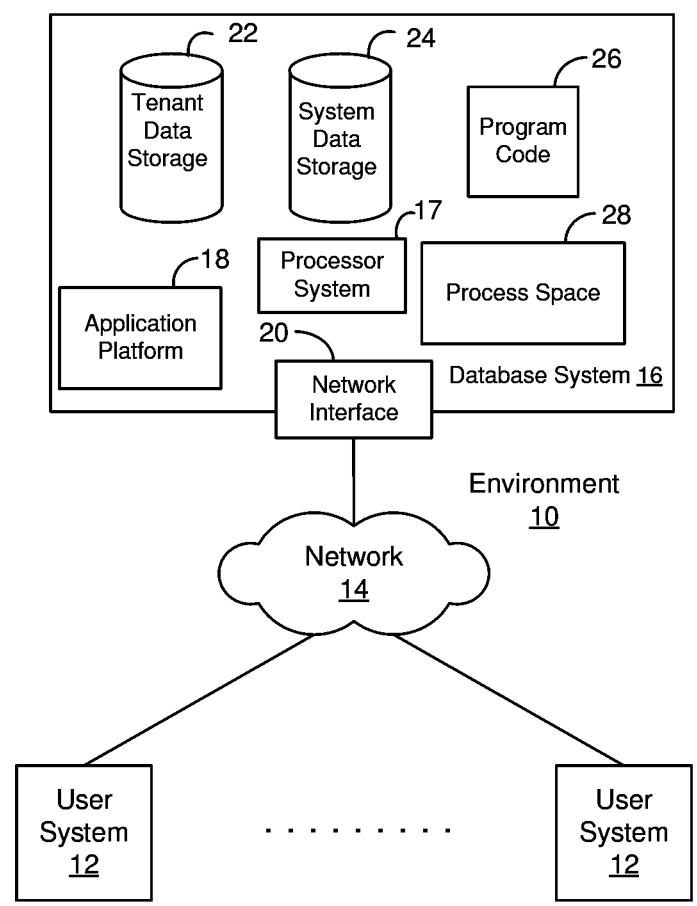
FIG. 8A shows a block diagram of an example of an environment 10 in which an on-demand database service can be used in accordance with some implementations.

FIG. 8A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 8A (and in more detail in FIG. 8B) user systems 12 might interact via a network 14 with an on-demand database service, which is implemented in the example of FIG. 8A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 8A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIGS. 7A and 7B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 8A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Figure 8B:
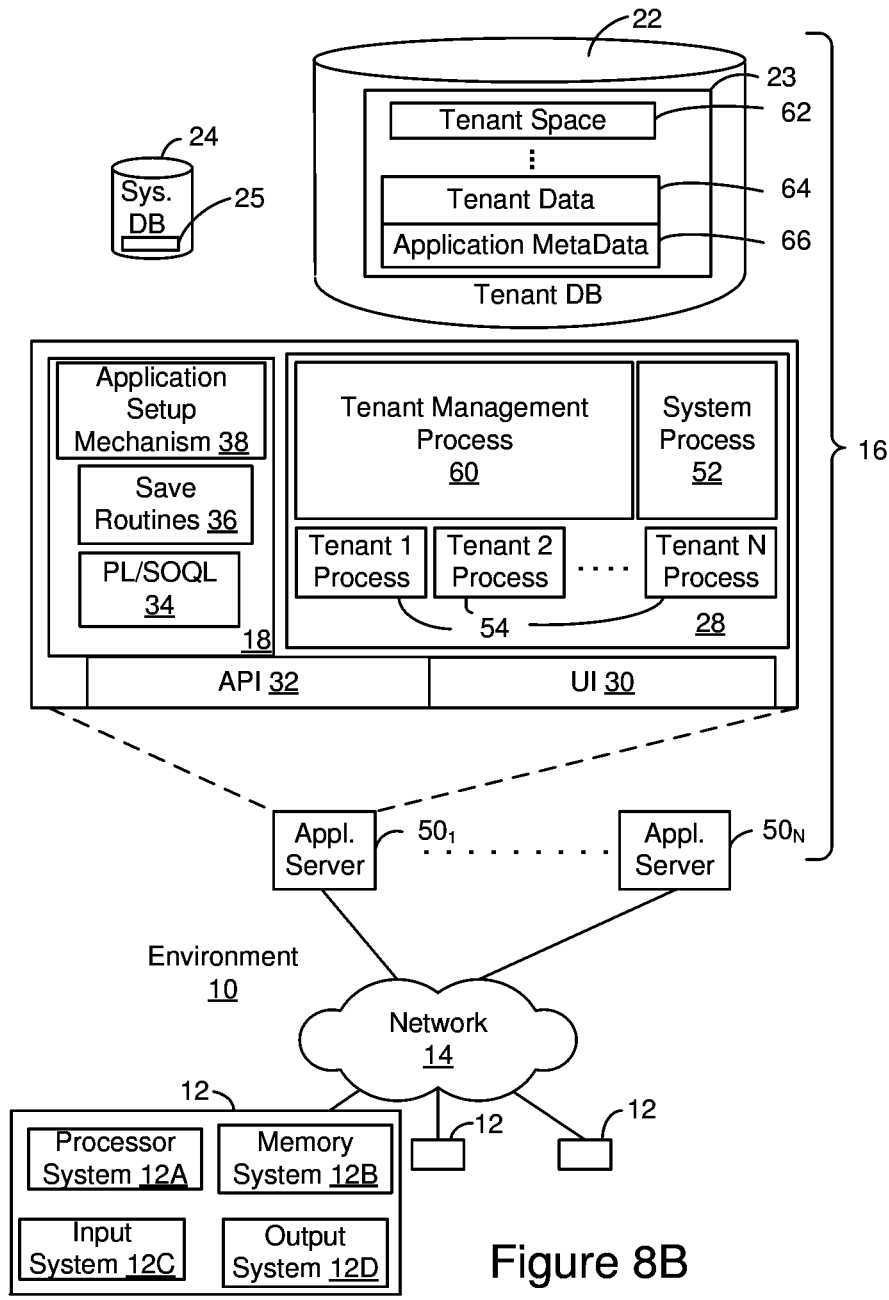
FIG. 8B shows a block diagram of an example of some implementations of elements of FIG. 8A and various possible interconnections between these elements.

FIG. 8B shows a block diagram of an example of some implementations of elements of FIG. 8A and various possible interconnections between these elements. That is, FIG. 8B also illustrates environment 10. However, in FIG. 8B elements of system 16 and various interconnections in some implementations are further illustrated. FIG. 8B shows that user system 12 may include processor system 12A, memory system 12B, input system 12C, and output system 12D. FIG. 8B shows network 14 and system 16. FIG. 8B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 8A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 8B, system 16 may include a network interface 20 (of FIG. 8A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 9A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

As shown in FIGS. 8A and 8B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 8A and 8B, some implementations of an on-demand database service environment may include anywhere from one to many devices of each type. Also, the on-demand database service environment need not include each device shown in FIGS. 8A and 8B, or may include additional devices not shown in FIGS. 8A and 8B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 9B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 9A and 9B.

FIG. 9B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

In some implementations, one or more application servers or other servers described above with reference to FIGS. 7A and 7B include a hardware and/or software framework configurable to execute procedures using programs, routines, scripts, etc. Thus, in some implementations, one or more of application servers $50_1$-$50_N$ of FIG. 8B can be configured to initiate performance of one or more of the operations described above by instructing another computing device to perform an operation. In some implementations, one or more application servers $50_1$-$50_N$ carry out, either partially or entirely, one or more of the disclosed operations. In some implementations, app servers 988 of FIG. 9B support the construction of applications provided by the on-demand database service environment 900 via the pod 944. Thus, an app server 988 may include a hardware and/or software framework configurable to execute procedures to partially or entirely carry out or instruct another computing device to carry out one or more operations disclosed herein. In alternative implementations, two or more app servers 988 may cooperate to perform or cause performance of such operations. Any of the databases and other storage facilities described above with reference to FIGS. 7A, 7B, 8A and 8B can be configured to store lists, articles, documents, records, files, and other objects for implementing the operations described above. For instance, lists of available communication channels associated with share actions for sharing a type of data item can be maintained in tenant data storage 22 and/or system data storage 24 of FIGS. 7A and 7B. By the same token, lists of default or designated channels for particular share actions can be maintained in storage 22 and/or storage 24. In some other implementations, rather than storing one or more lists, articles, documents, records, and/or files, the databases and other storage facilities described above can store pointers to the lists, articles, documents, records, and/or files, which may instead be stored in other repositories external to the systems and environments described above with reference to FIGS. 7A, 7B, 8A and 8B.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory (ROM) devices and random access memory (RAM) devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
a web page customization system implemented using at least one computing device, the web page customization system configurable to cause:
processing an indication of user input in relation to a modification to a portion of a web page, the modification including deletion of a user interface object from the web page or addition of a user interface object to the web page;
ascertaining at least one characteristic of run-time computing performance related to the modification to the portion of the web page, the at least one characteristic of run-time computing performance including processing speed;
generating or updating, based on the at least one characteristic of run-time computing performance related to the modification to the portion of the web page, at least one web page customization rule;
analyzing at least the portion of the web page using a plurality of web page customization rules comprising the generated or updated at least one web page customization rule, the plurality of web page customization rules including at least one of: a first rule pertaining to at least one user-selectable data object field or a second rule pertaining to at least one user-selectable web page component; and
providing feedback pertaining to customization of the web page for presentation by a client device, via a graphical user interface (GUI), based at least in part on a result of analyzing at least the portion of the web page using the plurality of web page customization rules, the feedback indicating the at least one characteristic of run-time computing performance related to the modification to the portion of the web page.

2. The system as recited in claim 1, the web page customization system further configurable to cause:

after providing the feedback pertaining to customization of the web page, storing the web page responsive to processing an indication of a request to save the web page;
ascertaining performance data related to the web page; and
updating one or more of the plurality of web page customization rules based, at least in part, on the performance data.

3. The system as recited in claim 1, the web page customization system further configurable to cause:
ascertaining performance data related to the web page;
generating or updating a machine learning model based, at least in part, on the performance data; and
generating or updating one or more of the plurality of web page customization rules using the machine learning model.

4. The system as recited in claim 1, wherein analyzing at least the portion of the web page is performed in real-time responsive to processing the indication of user input.

5. The system as recited in claim 1, wherein analyzing at least the portion of the web page comprises analyzing the web page and one or more additional web pages responsive to an indication of selection of a report generation user interface element.

6. The system as recited in claim 1, the plurality of web page customization rules including a set of rules associated with at least one of: a specific tenant of a multi-tenant database system, a particular web page type of the web page, a particular application associated with the web page, a server implementation of the web page customization system, a web browser implementation of the web page customization system, or characteristics of a client device implementing the web page customization system.

7. The system as recited in claim 1, the web page customization system further configurable to cause:
obtaining by a client device, from a server, the plurality of web page customization rules; and
storing the plurality of web page customization rules in a memory of the client device;
wherein processing, analyzing, and providing are performed by a web browser of the client device.

8. A method, comprising:
processing an indication of user input in relation to a modification to a portion of a web page, the modification including deletion of a user interface object from the web page or addition of a user interface object to the web page;
ascertaining at least one characteristic of run-time computing performance related to the modification to the portion of the web page, the at least one characteristic of run-time computing performance including processing speed;
generating or updating, based on the at least one characteristic of run-time computing performance related to the modification to the portion of the web page, at least one web page customization rule;
analyzing at least the portion of the web page using a plurality of web page customization rules comprising the generated or updated at least one web page customization rule, the plurality of web page customization rules including at least one of: a first rule pertaining to at least one user-selectable data object field or a second rule pertaining to at least one user-selectable web page component; and
providing feedback pertaining to customization of the web page for presentation by a client device, via a graphical user interface (GUI), based at least in part on a result of analyzing at least the portion of the web page using the plurality of web page customization rules, the feedback indicating the at least one characteristic of run-time computing performance related to the modification to the portion of the web page.

9. The method as recited in claim 8, further comprising:
after providing the feedback pertaining to customization of the web page, storing the web page responsive to processing an indication of a request to save the web page;
ascertaining performance data related to the web page; and
updating one or more of the plurality of web page customization rules based, at least in part, on the performance data.

10. The method as recited in claim 8, further comprising:
ascertaining performance data related to the web page;
generating or updating a machine learning model based, at least in part, on the performance data; and
generating or updating one or more of the plurality of web page customization rules using the machine learning model.

11. The method as recited in claim 8, wherein analyzing at least the portion of the web page is performed in real-time responsive to processing the indication of user input.

12. The method as recited in claim 8, wherein analyzing at least the portion of the web page comprises analyzing the web page and one or more additional web pages responsive to an indication of selection of a report generation user interface element.

13. The method as recited in claim 8, the plurality of web page customization rules including a set of rules associated with at least one of: a specific tenant of a multi-tenant database system, a particular web page type of the web page, a particular application associated with the web page, a server implementation of a web page customization system, a web browser implementation of the web page customization system, or characteristics of a client device implementing the web page customization system.

14. The method as recited in claim 8, further comprising:
obtaining by a client device, from a server, the plurality of web page customization rules;
storing the plurality of web page customization rules in a memory of the client device;
wherein processing, analyzing, and providing are performed by a web browser of the client device.

15. A computer program product comprising computer-readable program code capable of being executed by one or more processors when retrieved from a non-transitory computer-readable medium, the program code comprising computer-readable instructions configurable to cause:
processing an indication of user input in relation to a modification to a portion of a web page, the modification including deletion of a user interface object from the web page or addition of a user interface object to the web page;
ascertaining at least one characteristic of run-time computing performance related to the modification to the portion of the web page, the at least one characteristic of run-time computing performance including processing speed;
generating or updating, based on the at least one characteristic of run-time computing performance related to the modification to the portion of the web page, at least one web page customization rule;
analyzing at least the portion of the web page using a plurality of web page customization rules comprising the generated or updated at least one web page customization rule, the plurality of web page customization rules including at least one of: a first rule pertaining to at least one user-selectable data object field or a second rule pertaining to at least one user-selectable web page component; and
providing feedback pertaining to customization of the web page for presentation by a client device, via a graphical user interface (GUI), based at least in part on a result of analyzing at least the portion of the web page using the plurality of web page customization rules, the feedback indicating the at least one characteristic of run-time computing performance related to the modification to the portion of the web page.

16. The computer program product as recited in claim 15, the computer-readable instructions further configurable to cause:
after providing the feedback pertaining to customization of the web page, storing the web page responsive to processing an indication of a request to save the web page;
ascertaining performance data related to the web page; and
updating one or more of the plurality of web page customization rules based, at least in part, on the performance data.

17. The computer program product as recited in claim 15, wherein analyzing at least the portion of the web page is performed in real-time responsive to processing the indication of user input.

18. The computer program product as recited in claim 15, wherein analyzing at least the portion of the web page comprises analyzing the web page and one or more additional web pages responsive to an indication of selection of a report generation user interface element.

19. The computer program product as recited in claim 15, the plurality of web page customization rules including a set of rules associated with at least one of: a specific tenant of a multi-tenant database system, a particular web page type of the web page, a particular application associated with the web page, a server implementation of a web page customization system, a web browser implementation of the web page customization system, or characteristics of a client device implementing the web page customization system.

20. The computer program product as recited in claim 15, the computer-readable instructions further configurable to cause:
obtaining by a client device, from a server, the plurality of web page customization rules;
storing the plurality of web page customization rules in a memory of the client device;
wherein processing, analyzing, and providing are performed by a web browser of the client device.

* * * * *